April 2, 1935.  F. SASS  1,996,710
REGULATION MEANS FOR INTERNAL COMBUSTION ENGINES
WITH INJECTION WITHOUT AIR AND VARIABLE SPEED
Filed Aug. 28, 1929   2 Sheets-Sheet 2
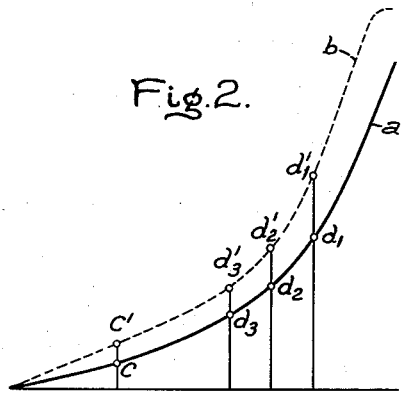
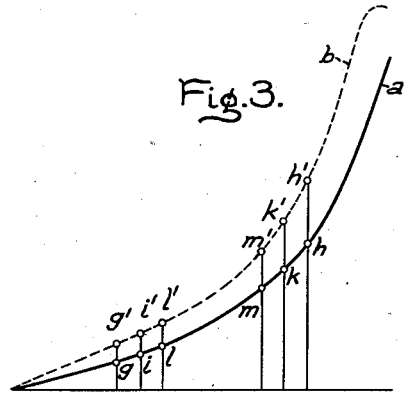
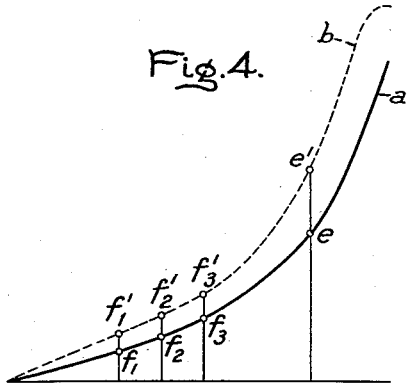
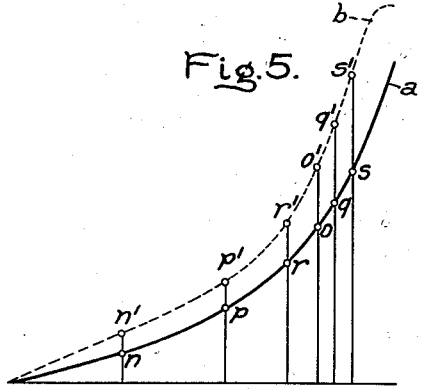
Inventor:
Friedrich Sass,
by Charles E. Tullar
His Attorney.

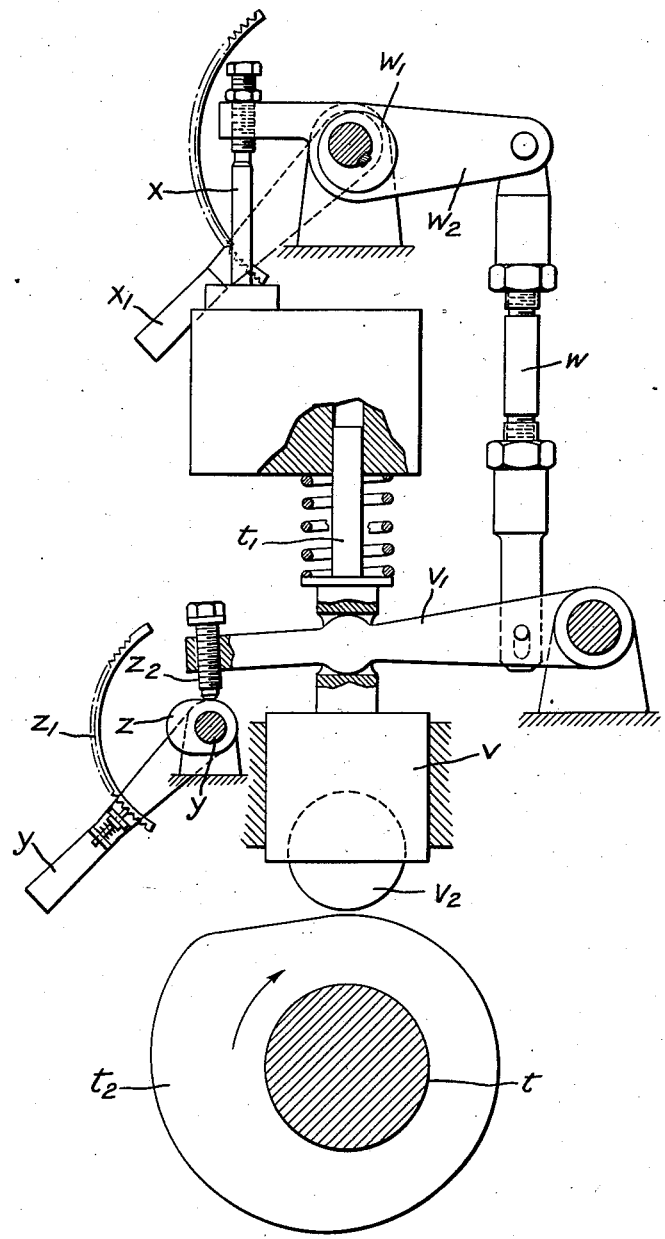

Patented Apr. 2, 1935

1,996,710

UNITED STATES PATENT OFFICE 1,996,710

REGULATION MEANS FOR INTERNAL COMBUSTION ENGINES WITH INJECTION WITHOUT AIR AND VARIABLE SPEED

Friedrich Sass, Berlin-Charlottenburg, Germany, assignor to General Electric Company, a corporation of New York Application August 28, 1929, Serial No. 389,053
In Germany September 11, 1928

4 Claims. (Cl. 123—139)

It is known in the case of internal combustion engines to effect the regulation of the quantity of fuel by maintaining the commencement of the injection constant and changing the end of the injection. It is also known to adapt the quantity injected to the load by maintaining the end of the injection constant and regulating or changing the commencement of the injection, and finally the combination of both kinds of regulation is known, namely, to regulate the commencement of the injection and at the same time the end thereof.

With all these regulating methods no consideration, however, has hitherto been given to the speed or force with which the fuel is delivered by the fuel pump. This is not necessary in the case of Diesel engines with injection of fuel with air, since the speed of injection of the fuel is not determined by the speed of the fuel cam, that is to say, by the speed of the raising of the needle but by the excess pressure of the injection air over the compression pressure in the cylinder. Thus, in the case of Diesel engines, it is only a question of the adaptation of the quantity of fuel to the changing load and this can be effected with each of the above-mentioned regulating methods.

In the case of internal combustion engines which work with injection without air and variable speed, the known regulating methods have the drawback that when the machine is running slowly the fuel cam effecting the injection which is driven from the crank shaft, moves so slowly that the injection becomes very protracted and the spray comes out no longer sufficiently fine.

The present invention has for its object an improved construction and arrangement for overcoming this drawback. Another object of the invention comprises an improved method for operating a combustion engine of the type specified. This is accomplished by the provision of a single non-adjustable pump drive cam with variable steepness. With decreasing speed the position of the injection curve on the cam actuating the fuel pump, that is the commencement and the end of the curve are put into a steep range of the fuel cam so that even with the lowest engine speed the speed of injection remains still sufficiently great and the spray sufficiently fine. The regulation according to the invention therefore works in such a manner that with decreasing speed the commencement of the fuel injection is so delayed on the fuel cam that the commencement is effected later, while the end of the injection is adapted to the output desired for the time being and the entire injection curve falls in a steeper range of the cam, so that even with slow speed the speed of injection still remains sufficient. Therefore the end of the injection in the case of the new regulating method can remain the same or take place later according to the amount of delay of the commencement, or with very great decrease of the output, can occur sooner. It is only essential for the invention that the entire injection curve in the case of diminished speed is shifted into a steeper range of the cam, so that the decrease in speed of the fuel pump piston, and therefore the injection, positively associated with the decrease in speed of rotation, can be entirely or partly balanced.

In the drawings, Fig. 1 is a side elevation of a diagrammatic nature partly in section of an arrangement embodying the invention and the curves of Figs. 2 to 5 illustrate the operation of the construction shown in Fig. 1.

Referring to Fig. 1, $t$ indicates the driving shaft for the piston $t_1$ of the fuel pump, which is actuated by the fuel cam $t_2$ by means of the roller guide $v$. Cam $t_2$ has a single continuous cam surface of variable steepness and is securely fastened to shaft $t$. The roller guide $v$ moves the lever $v_1$ in the usual way, which lever $v_1$ in turn moves through the thrust rod $w$ the lever $w_2$ mounted on the eccentric $w_1$. The left end of the leer $w_2$ moves the spindle $x$ of the suction or overflow valve of the fuel pump for fixing the end of the injection. If, with the help of the hand lever $x_1$ the eccentric $w_1$ is turned, then the end of the injection is delayed. In this case the eccentric $w_1$ can be so keyed on to its shaft that the end of the injection remains almost unchanged (regulation method Figure 4 hereinafter described) or also so that the injection end is arranged later (regulating method according to Figure 5 hereinafter described).

The commencement of the injection in the present example is delayed by means of the lever $y$ which is rigidly connected with a cam $z$ and can be adjusted on a toothed segment $z_1$. If the lever $y$ in Figure 1 is turned upwards then the cam $z$ is so turned that the screw $z_2$ is somewhat raised by the cam $z$. Thereby the lever $v_1$ is lifted into a somewhat higher position and simultaneously the roller guide $v$ together with its roller $v_2$ is raised. The play between the cam $t_2$ and the roller $v_2$ is thereby increased; the roller $v_2$ goes up to a later point of time on the fuel cam and the commencement of the injection of the fuel is effected correspondingly later (regulating method according to Figures 4 and 5).

By appropriate keying of the eccentric $w_1$ on its shaft and by a corresponding formation of the cam $z$, the shortening of the injection curve can be easily adapted to the decreasing load and decreasing speed and simultaneously the injection curve can be arranged so much later that the shortened injection curve is displaced into a steeper range of the fuel cam. The speed of the pump piston $t_1$ and therefore also the speed of injection decreased as a result of the decreasing speed of rotation is thereby brought back to the normal value.

The levers $x_1$ and $y$ can also be connected with one another by means of an appropriate rod system (not indicated in Figure 1) so that the displacement is effected by means of a single manipulation.

It is, of course, possible without difficulty, to apply the method and arrangement described to single and multi-cylinder internal combustion engines.

The difference of the new regulating method from the known methods can be seen from Figures 2–5. In these figures the full line curve $a$ indicates the developed form of the fuel cam, whereas the ordinates of the dotted curve $b$ represent the associated speeds of the pump piston in an appropriate scale and therewith also the curve of the injection speeds of the fuel in another scale, because with the injection without air the speed of the pump piston and the speed of the injection are proportional. In the case of the known regulation of Figure 2, for example, constant commencement of the injection (point $c$ on the cam) and variable end of the injection (points $d_1$, $d_2$, $d_3$) being assumed; the ordinates of curve $b$ with the end points $c'$, $d'_1$, $d'_2$, $d'_3$ give the associated injection speeds of the fuel. The points $d_1$ and $d'_1$ correspond to a greater injection quantity, the points $d_2$ and $d'_2$ to a smaller, and the points $d_3$ and $d'_3$ to the smallest quantity of fuel. It will be seen that with decreasing quantity injected the speed of injection is the same at the commencement but always becomes smaller at the end, and that with decreasing speed of rotation in the case of which the injection speed is also smaller at the commencement, the end speed of the injection owing to the double reason of the decrease in speed of rotation and the earlier placing of the end of the injection, decreases. In the case of the regulation according to Figure 3, also known, the same applies for the end of the injection as for Figure 2 which also in this case takes place earlier with decreasing output. Moreover, with the known regulation according to Figure 3, the commencement of the injection is arranged later (points $g$, $i$, $l$ of the fuel cam or points $g'$, $i'$, $l'$ of the piston or injection speed). The later arrangement or retarding of the commencement of the injection moderates somewhat in this case the decrease in the speed of the fuel injection with decreasing speed in rotation, because the points $i$ and $l$ fall in a steeper range of the cam. On the whole, however, even in the case of the regulating method according to Figure 3, the speed of injection in the case of small loads and particularly with small rotation speeds is less than with full load, so that also in this case, with decreasing speed of rotation the injection takes place very slowly.

On the other hand the Figures 4 and 5 show the injection speeds which occur with the method of regulation according to the present invention.

In Figure 4, in the well-known way, the commencement of the injection with decreasing load is arranged later (points $h_1$, $h_2$, $h_3$ on the fuel cam or $f'_1$, $f'_2$, $f'_3$ on the speed curve) and the end of the injection, points $e$, $e'$, is assumed to be constant. It can already be observed, however, from Figure 4, that the injection curves $f_{1e}$, $f_{2e}$, $f_{3e}$, becoming shorter with decreasing output, fall into ranges of greater injection speed since, for example, the mean injection speed on the injection curve $f'_{3}e'$ is greater than on the injection curve $f'_{1}e'$. If the speed of a machine which is equipped with the new regulating method according to Figure 4 decreases, then, of course, with great decrease of the speed the mean injection speed can be smaller on the injection curve $f'_{3}e'$ than on the curve $f'_{1}e'$, but it is observable that the displacement of the injection curve into a steeper range of the cam at least partly compensates for the decrease of the injection speed caused by the decrease of the rotation speed. This is the case in a still greater measure with the new regulating device according to Figure 5, where with decreasing output, not only the commencement (points $n$, $p$, $r$ and $n'$, $p'$, $r'$) but also the end of the injection is arranged later. The sections of the cam on which the injection is effected in the case of the regulating method according to Figure 5, are then, for example, with full load $n$ $o$ and $n'$ $o'$, with part loads $p$, $q$ and $p'$ $q'$ or $r$ $s$ and $r'$ $s'$ in the case of the smallest load. In this case the injection curve with the smallest load is in the range of the greatest piston or injection speed and if now besides the load, the speed of rotation is also diminished, then the injection speed of the fuel is not by a long way so greatly decreased as the speed of rotation itself, but as a result of the displacement of the injection curve on the cam, it becomes relatively greater, so that approximately the same main injection speed and an equally good spraying can be obtained with the smallest as well as with the greatest load, although the speed of rotation has diminished.

With my invention I have accomplished an improved construction for combustion engines and an improved method for operating these engines whereby the relative mean injection speed is maintained substantially constant at varying speeds of the engine. By "relative mean injection speed" is meant the mean injection speed with reference to a definite speed of the engine.

What I claim as new and desire to secure by Letters Patent of the United States, is:

1. A method of controlling internal combustion engines with airless injection and a single non-adjustable pump cam having a cam surface with a gradually inclined portion ahead of a steep portion as regards the direction of rotation, said method comprising delaying the beginning of the fuel injection with decreasing engine speed to increase the relative mean speed of injection.

2. A method of controlling internal combustion engines with airless injection and a single non-adjustable pump cam having a cam surface with a gradually inclined portion ahead of a steep portion as regards the direction of rotation, said method comprising delaying the beginning and the end of the fuel injection with decreasing engine speed to increase the relative mean speed of injection.

3. The method of controlling an internal combustion engine with airless fuel injection having a reciprocating fuel pump, a roller connected to the pump piston, a single non-adjustable pump cam for actuating said roller, said cam having a cam surface with a steep portion following a gradually sloped portion in circumferential direction of the cam, a relief valve for determining the end of the effective injection stroke of the pump, and means including a lever with an adjustable eccentric for operating said relief valve, said method comprising the increasing of the relative mean injection speed with decreasing engine speed by moving the roller away from the cam to delay the beginning of the fuel injection.

4. The method of controlling an internal combustion engine with airless fuel injection having a reciprocating fuel pump, a roller connected to the pump piston, a single non-adjustable pump cam for actuating said roller, said cam having a cam surface with a steep portion following a gradually sloped portion in circumferential direction of the cam, a relief valve for determining the end of the effective injection stroke of the pump, and means including a lever with an adjustable eccentric for operating said relief valve, said method comprising the increasing of the relative mean injection speed with decreasing engine speed by moving the roller away from the cam to delay the beginning of the fuel injection, and turning the eccentric to delay actuation of the relief valve whereby the injection is shifted into a steeper range of said cam surface.

FRIEDRICH SASS.